(12) United States Patent
Hu et al.

(10) Patent No.: US 12,418,892 B2
(45) Date of Patent: Sep. 16, 2025

(54) METHODS AND APPARATUSES FOR SIDELINK CONTROL INFORMATION RECEPTION

(71) Applicant: Lenovo (Beijing) Limited, Beijing (CN)

(72) Inventors: Jie Hu, Beijing (CN); Jing Han, Beijing (CN); Haiming Wang, Beijing (CN); Lianhai Wu, Beijing (CN); Xiaodong Yu, Beijing (CN); Zhennian Sun, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 371 days.

(21) Appl. No.: 18/031,695

(22) PCT Filed: Oct. 22, 2020

(86) PCT No.: PCT/CN2020/122737
§ 371 (c)(1),
(2) Date: Apr. 13, 2023

(87) PCT Pub. No.: WO2022/082577
PCT Pub. Date: Apr. 28, 2022

(65) Prior Publication Data
US 2024/0023069 A1    Jan. 18, 2024

(51) Int. Cl.
*H04W 72/02* (2009.01)
*H04W 72/25* (2023.01)
*H04W 76/28* (2018.01)

(52) U.S. Cl.
CPC ........... *H04W 72/02* (2013.01); *H04W 72/25* (2023.01); *H04W 76/28* (2018.02)

(58) Field of Classification Search
CPC ..... H04W 72/02; H04W 72/25; H04W 76/28; H04W 72/20; H04W 76/14; H04W 92/18
See application file for complete search history.

(56) References Cited

U.S. PATENT DOCUMENTS

2008/0299996 A1    12/2008    Tseng

FOREIGN PATENT DOCUMENTS

| CN | 109391671 A | * | 2/2019 | ............ H04W 72/53 |
| EP | 3499994 A1 | * | 6/2019 | ........... H04L 5/0078 |

OTHER PUBLICATIONS

PCT/CN2020/122737 , "International Preliminary Report on Patentability", PCT Application No. PCT/CN2020/122737, May 4, 2023, 5 pages.

(Continued)

*Primary Examiner* — Ayanah S George
(74) *Attorney, Agent, or Firm* — FIG. 1 Patents (57) ABSTRACT

Disclosed are methods and apparatus for performing sidelink control information reception for sidelink on a user equipment configured with discontinuous reception functionality. One embodiment of the subject application provides a method performed by a user equipment, including configuring, for a first user equipment configured with Mode 2 resource selection for sidelink and configured with discontinuous reception functionality, a period during which the first user equipment performs sidelink control information reception or during which at least one resource sensing result obtained by at least one other user equipment is requested by the first user equipment, and performing sidelink control information reception at least during the period or receiving the at least one resource sensing result from the at least one other user equipment.

20 Claims, 6 Drawing Sheets

(56) References Cited

OTHER PUBLICATIONS

PCT/CN2020/122737, "International Search Report and Written Opinion", PCT Application No. PCT/CN2020/122737, Jun. 25, 2021, 6 pages.

* cited by examiner

METHODS AND APPARATUSES FOR SIDELINK CONTROL INFORMATION RECEPTION

TECHNICAL FIELD

Various example embodiments relate to methods and apparatuses for sidelink (SL) control information (SCI) reception.

BACKGROUND OF THE INVENTION

SL resource allocation support several modes, for examples, Mode 1 resource selection is for resource allocation by a gNB, Mode 2 resource selection is for user equipment (UE) autonomous resource selection. The basic structure of Mode 2 is of a UE sensing, within a (pre-)configured resource pool, which resources are not in use by other UEs with higher-priority traffic, and selecting an appropriate amount of such resources for its own transmissions. Having selected such resources, the UE can transmit and re-transmit in them a certain number of times, or until a cause of resource reselection is triggered.

The UE autonomous resource selection procedure (i.e., Mode 2 resource selection procedure) includes a sensing procedure and a resource selection procedure, wherein the sensing procedure is for sensing and reserving resources in the physical layer. Furthermore, there may be a resource re-evaluation procedure shortly before SL transmitting in a reserved resource, during which UE re-evaluates the set of resources from which it can select, to check whether its intended transmission is still suitable, taking account of late-arriving SCIs due, typically, to an aperiodic higher-priority service starting to transmit after the end of the original sensing window. If the reserved resources are not part of the set for selection at this time any longer, the selected resources are updated.

SUMMARY

In some embodiments, a method includes configuring, for a first UE configured with Mode 2 resource selection for SL and configured with discontinuous reception (DRX) functionality, a period during which the first UE performs SCI reception or during which at least one resource sensing result obtained by at least one other UE is requested by the first UE, and performing SCI reception at least during the period or receiving the at least one resource sensing result from the at least one other UE.

In some embodiments, the method further includes starting a timer at an outset of the period and stopping the timer at the cut-off time of the period, wherein the first UE performs SCI reception when the timer is running.

In some embodiments, wherein a length of the timer is configured per resource pool or associated with a packet delay budget (PDB) of generated traffic, and the timer is maintained per resource pool, per SL unicast link, per SL radio bearer (SLRB) or associated with the first UE.

In some embodiments, wherein the period is configured to include at least a re-evaluation window.

In some embodiments, wherein configuring the period during which the first UE performs SCI reception further includes configuring the period to be from a resource selection trigger time to a resource re-evaluation cut-off time, or configuring the period to be from an ending time of a DRX-on period to the resource re-evaluation cut-off time, wherein the resource selection trigger time is in the DRX-on period.

In some embodiments, wherein in response to configuring the period during which the at least one resource sensing result obtained by the at least one other UE is requested by the first UE, the method further includes transmitting an assistance request to a second UE for requesting a resource sensing result obtained by the second UE during the period, and receiving the resource sensing result from the second UE, wherein the second UE is a sidelink peer UE of the first UE, and a PC5 radio resource control (RRC) connection is established between first UE and second UE, and the period includes at least a part of the DRX-off period.

In some embodiments, wherein the first UE transmits the assistance request to the second UE via a PC5 radio resource control (PC5-RRC) signaling, and receives the resource sensing result from the second UE via a PC5 RRC signaling.

In some embodiments, wherein the second UE provides a DRX configuration to the first UE, and ignores the assistance request sent by the first UE.

In some embodiments, wherein the second UE is a roadside unit (RSU).

In some embodiments, wherein the assistance request at least indicates the period during which the resource sensing result obtained by the second UE is requested, and a period of a response time window during which the first UE receives the resource sensing result, and the first UE receives the resource sensing result during the response time window.

In some embodiments, wherein resource for transmitting the assistance request is selected randomly by the first UE.

In some embodiments, wherein in response to configuring the period during which the at least one resource sensing result obtained by the at least one other UE is requested by the first UE, the method further includes transmitting an assistance request to at least one third UE for requesting the at least one resource sensing result obtained by the at least one third UE during the period, and receiving the at least one resource sensing result from the at least one third UE, wherein the at least one third UE meets a criterion, wherein the period includes at least a part of the DRX-off period.

In some embodiments, wherein the first UE transmits the assistance request to the at least one third UE via a groupcast signaling or a broadcast signaling.

In some embodiments, wherein the at least one resource sensing result is sent by the at least one third UE via a groupcast signaling, a broadcast signaling, or a PC5-RRC signaling.

In some embodiments, wherein a PC5 RRC connection is established between the first UE and the at least one third UE in response to that the at least one resource sensing result is sent via a PC5-RRC signaling.

In some embodiments, wherein the criterion at least includes one of zone information, distance information, a SL reference signal receiving power (SL-RSRP) threshold.

In some embodiments, wherein the at least one third UE locates in the same zone where the first UE locates.

In some embodiments, wherein the distance information includes at least location information of the first UE and a distance range between the first UE and the at least one third UE.

In some embodiments, wherein the assistance request at least indicates the criterion, the period during which the at least one resource sensing result is requested, and a period of a response time window during which the first UE receives the at least one resource sensing result, and the first UE receives the at least one resource sensing result during the response time window.

In some embodiments, wherein resource for transmitting the assistance request is selected randomly by the first UE.

In some embodiments, wherein the period is configured to include at least a resource sensing window and a resource re-evaluation window.

In some embodiments, wherein in response to that a resource selection trigger time is in the DRX-on period, configuring the period during which the first UE performs SCI reception further comprises at least one of: configuring the resource sensing window to start at an outset of the DRX-on period and end before the resource selection trigger time, configuring the resource re-evaluation window to start before an end of the DRX-on period, and configuring the resource re-evaluation window to end in advance at the end of the DRX-on period in response to that a resource re-evaluation cut-off time is in a DRX-off period, or configuring the resource re-evaluation window at the resource re-evaluation cut-off time in response to that the resource re-evaluation cut-off time is in the DRX-on period.

In some embodiments, wherein a duration of the resource sensing window is determined based on a traffic type.

In some embodiments, wherein in response to that a resource selection trigger time is in a DRX-off period, configuring the period during which the first UE performs SCI reception further comprises at least one of: configuring the resource sensing window to start at an outset of a last DRX-on period before the DRX-off period and end at a cut-off time of the last DRX-on period, and performing SCI reception in the resource re-evaluation window.

In some embodiments, wherein performing SCI reception in the resource re-evaluation window further comprises: performing SCI reception from the resource selection trigger time to a resource re-evaluation cut-off time in response to that selected resource or the resource re-evaluation cut-off time is in the DRX-off period, or configuring the resource re-evaluation window to start from an outset of a DRX-on period next to the DRX-off period and end at the resource re-evaluation cut-off time in response to that the selected resource or the resource re-evaluation cut-off time is in the DRX-on period next to the DRX-off period.

In some embodiments, wherein configuring a period during which the first UE performs SCI reception further comprises performing SCI reception when a resource pool is configured.

In some embodiments, an apparatus includes a non-transitory computer-readable medium having stored thereon computer-executable instructions, a receiving circuitry, a transmitting circuitry, and a processor coupled to the non-transitory computer-readable medium, the receiving circuitry and the transmitting circuitry, wherein the computer-executable instructions cause the processor to implement a method. The method includes configuring, for a first UE configured with Mode 2 resource selection for SL and configured with discontinuous reception (DRX) functionality, a period during which the first UE performs SCI reception or during which at least one resource sensing result obtained by at least one other UE is requested by the first UE, and performing SCI reception at least during the period or receiving the at least one resource sensing result from the at least one other UE.

BRIEF DESCRIPTION OF THE DRAWINGS

Some example embodiments will now be described, by way of non-limiting examples, with reference to the accompanying drawings.

DETAILED DESCRIPTION

The detailed description of the appended drawings is intended as a description of the preferred embodiments of the present invention, and is not intended to represent the only form in which the present invention may be practiced. It should be understood that the same or equivalent functions may be accomplished by different embodiments that are intended to be encompassed within the spirit and scope of the present invention.

Reference will now be made in detail to some methods, embodiments, and apparatuses of the present disclosure, examples of which are illustrated in the accompanying drawings. To facilitate understanding, these methods, embodiments, and apparatuses are provided under specific network architecture and new service scenarios, such as 3rd Generation Partnership Project (3GPP) 5G and so on. It is contemplated that along with developments of network architectures and new service scenarios, all embodiments in the present application are also applicable to similar technical problems, and moreover, the terminologies recited in the present application may change, which should not affect the principle of the present application.

The present disclosure relates to SCI reception by a UE. The UE always monitors a physical sidelink control channel (PSCCH) and a physical sidelink shared channel (PSSCH) to perform SCI reception.

However, some kinds of UEs have no sufficient battery capability; they cannot always monitor the PSCCH and the PSSCH. And in some cases, for example, if the traffic data is small and/or burst/aperiodic, the UE does not need to always monitor the PSCCH and the PSSCH. Therefore, the UE may be configured with DRX functionality, wherein during a DRX-off period, the UE does not perform SCI reception, i.e., the UE does not monitor PSCCH and PSSCH to perform SCI reception. The UE merely perform SCI reception during a DRX-on period. The DRX functionality is useful for the UEs (such as UEs with battery constraint, vulnerable road UEs (VRUs), UEs in public safety and commercial user cases) to perform SL operations in a power efficient manner.

Yet, when a UE performing SCI reception is configured with DRX functionality, an issue may occur.

Regarding Mode 2 resource selection, a UE performs sensing and reserving resources for data transmission by monitoring SCI from other UEs. Considering a UE configured with DRX functionality, the UE cannot perform SCI reception during DRX-off period, corresponding SCI information during the DRX-off period is missed. Therefore, corresponding resource reserving and resource pre-emption for SL cannot be performed properly. As a result, the SL transmission efficiency may be greatly reduced; especially the performance of time-sensitive traffic is deteriorated.

Figure 1:
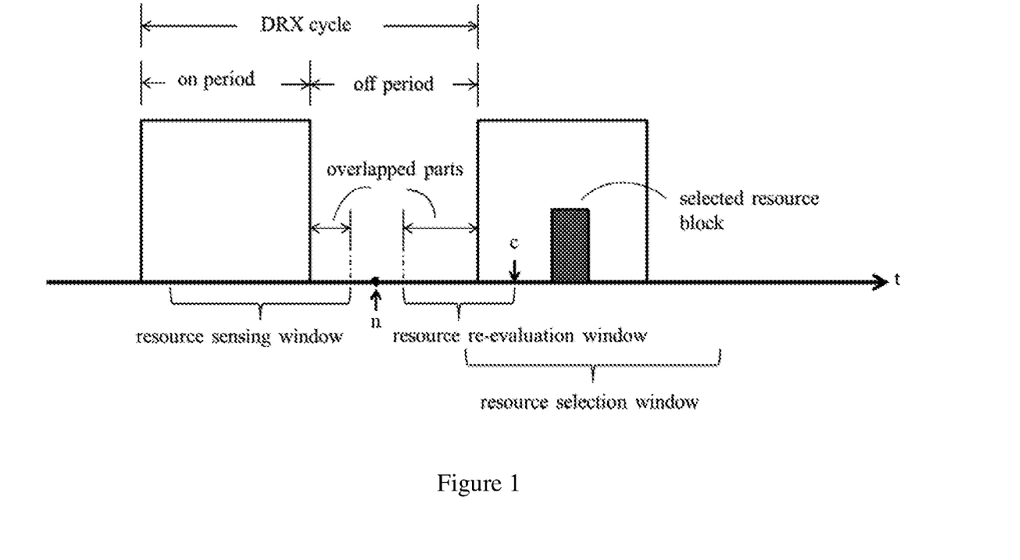
FIG. 1 illustrates an example of performing SCI reception on a DRX-configured UE.

FIG. 1 illustrates an example illustrating performing SCI reception on a DRX-configured UE, wherein the time c is a resource re-evaluation cut-off time.

As shown in FIG. 1, when a resource selection for traffic is triggered at time n, if the UE is not configured with the DRX functionality, the UE selects and reserves resource for SL transmitting during the resource selection window based on the resource sensing result during the sensing window and performs resource re-evaluation during the re-evaluation window. After the resource re-evaluation cut-off time c, the UE may perform SL transmitting on a selected resource block.

However, if the UE is configured with the DRX functionality, the UE performs SCI reception during the DRX-on period, and does not perform SCI reception during the DRX-off period. As shown in FIG. 1, as the sensing window and the re-evaluation window partly overlap with the DRX-off period, the UE cannot perform SCI reception during the overlapped parts, as shown in FIG. 1. Therefore, the UE cannot reserve and preempt resource based on sensing results properly. Correspondingly, the UE may delay the resource selection, which results in the SL transmitting being delayed. The problem is serious for a time-sensitive traffic and is more particularly if the time-sensitive traffic periodically occurs.

For example, if the UE can perform SCI reception during the overlapped parts shown in FIG. 1, the performs of SL transmitting may not be affected by DRX functionality.

Figure 2:
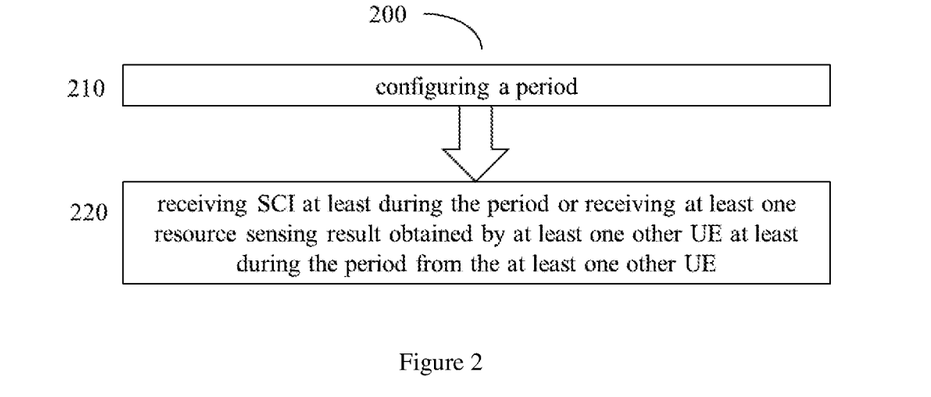
FIG. 2 illustrates an exemplary method according to the present disclosure.

FIG. 2 shows an exemplarily method 200 according to embodiments of the present disclosure.

As shown in FIG. 2, the method 200 at least includes an operation 210 of configuring, for a first UE configured with Mode 2 resource selection for SL and configured with DRX functionality, a period P during which the first UE performs SCI reception or during which at least one resource sensing result obtained by at least one other UE is requested by the first UE; and an operation 220 of performing SCI reception by the first UE at least during the period P or receiving the at least one resource sensing result from the at least one other UE. The at least one sensing result is sensed by the at least one other UE during the period P.

In some embodiments, since the resource pools are discrete, when the first UE configures to perform SCI reception in the period P, the first UE merely performs SCI reception at the time when at least one resource pool in the period P is configured.

In some embodiments, in response to that the period is configured where the UE performs SCI reception, the first UE may further define a timer, the timer starts at the outset of the period P and stops at the cut-off time of the period P, wherein the first UE performs SCI reception when the timer is running.

In some embodiments, wherein a length of the timer is configured per resource pool or associated with a PDB of generated traffic, and the timer is maintained per resource pool, per SL unicast link, per SLRB or associated with the first UE.

According to the method 200, in response to that the period P is configured where to perform SCI reception, the first UE may receive the SCI information at least during the period P. It means that the first UE performs SCI reception throughout the whole period P, no matter whether the period P is partly or wholly overlapped with DRX-off periods.

In some embodiments, the period P is partly overlapped with the DRX-off period, the first UE may mandatorily wake up the DRX functionality and perform SCI reception during the overlapped part. Referring to FIG. 1 again, according to method 200 of the present disclosure, the first UE mandatorily perform SCI reception during the two overlapped parts. If the period P is wholly overlapped with the DRX-off period, then according to method 200 of the present disclosure, the first UE mandatorily perform SCI reception throughout the whole period P.

In some embodiments, when out of the period P, whether the first UE performs SCI reception depends on whether the time is in a DRX-on period or in a DRX-off period.

Figure 3:
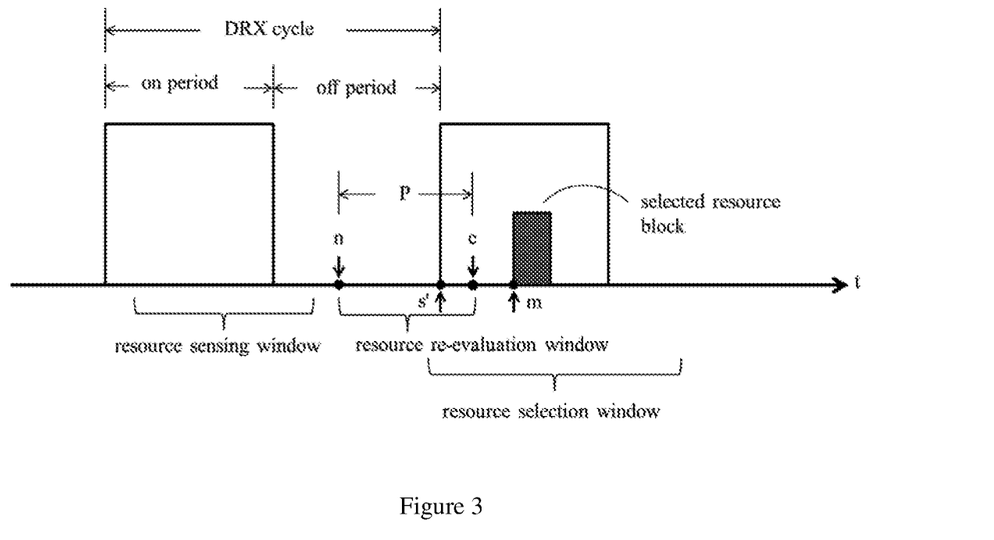
FIG. 3 illustrates an exemplary period for SCI reception according to the present disclosure.
Figure 4:
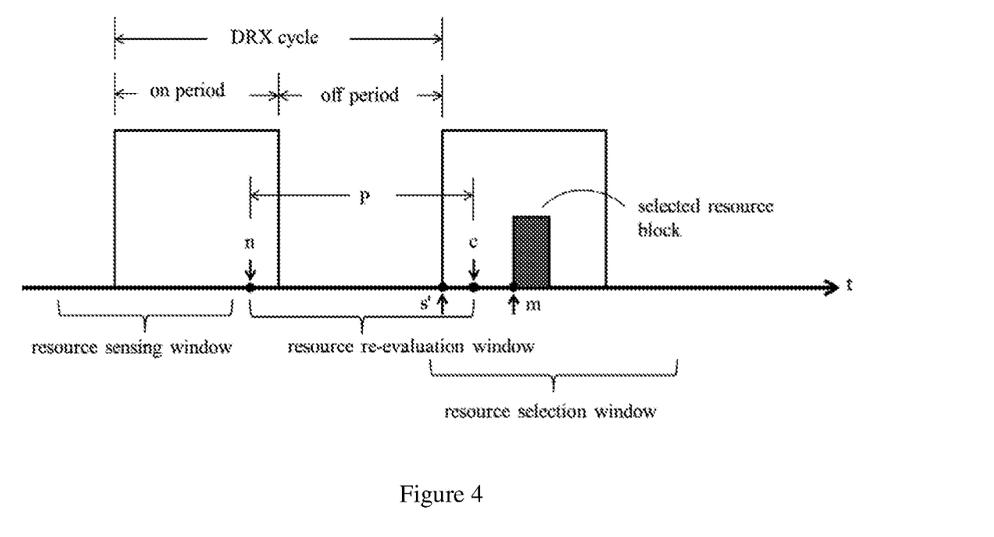
FIG. 4 illustrates an exemplary period for SCI reception according to the present disclosure.
Figure 5:
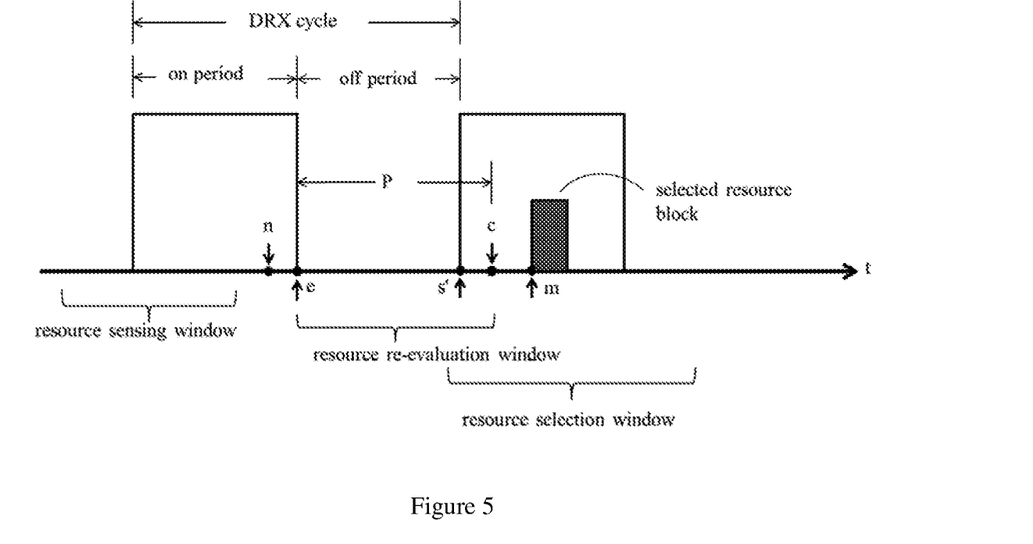
FIG. 5 illustrates an exemplary period for SCI reception according to the present disclosure.

In some embodiments, the period P is configured to include at least a resource re-evaluation window. The period P starts from the resource selection trigger time to a resource re-evaluation cut-off time. During the period P, the first UE mandatorily performs SCI reception even if the period P is partly or wholly overlapped with DRX-off periods. Accordingly, the first UE may perform SCI reception at least during the re-evaluation window. FIG. 3, FIG. 4, and FIG. 5 show several examples of the period P according to some embodiments of the present disclosure.

In some embodiments, the length of the resource sensing window and/or the length of the resource re-evaluation window may be adjusted according to the present disclosure. For example, in some embodiments, the resource re-evaluation window may end in advance before the resource re-evaluation cut-off time c, wherein the resource re-evaluation cut-off time c is a predicted value of the resource re-evaluation cut-off time without considering DRX functionality.

FIG. 3 illustrates an exemplary period P according to some embodiments of the method 200, wherein the resource selection trigger time n is in a DRX-off period, the period P is configured to be from the resource selection trigger time n to a resource re-evaluation cut-off time c. During the period P, the first UE performs SCI reception. At the time m, the first UE begins to perform SL transmitting on a selected resource block.

Furthermore, in some embodiments, if the resource re-evaluation cut-off time c is in the DRX-on period next to the DRX-off period as shown in FIG. 3, the period P may be configured to end, instead of at the resource re-evaluation cut-off time c, but at the outset s' of the DRX-on period next to the DRX-off period in advance.

FIG. 4 illustrates an exemplary period P according to some embodiments of the method 200. wherein the resource selection trigger time n is in a DRX-on period, the period P is configured to be from the resource selection trigger time n to the resource re-evaluation cut-off time c. During the period P, the first UE performs SCI reception. At the time m, the first UE begins to perform SL transmitting on a selected resource block.

Furthermore, in some embodiments, if the resource re-evaluation cut-off time c is in a DRX-on period next to the DRX-off period, the period P may be configured to end at the outset s' of the DRX-on period next to the DRX-off period in advance.

In some embodiments, if the resource selection trigger time n is in a DRX-on period, as the first UE performs SCI reception during the DRX-on period, the period P need not include the period from the resource selection trigger time n to the ending time e of the DRX-on period. The period P may be configured to start from an ending time e of the DRX-on period to the resource re-evaluation cut-off time c, as shown in FIG. 5. During the period P, the first UE performs SCI reception. At the time m, the first UE begins to perform SL transmitting on a selected resource block.

Furthermore, in some embodiments, if the resource re-evaluation cut-off time c is in a DRX-on period next to the DRX-on period, the period P may be configured to end at the outset s' of the DRX-on period next to the DRX-off period in advance.

According to the embodiments of the period P illustrated in FIG. 3, FIG. 4, and FIG. 5, the first UE may perform SCI reception during the resource re-evaluation window, no matter whether the resource re-evaluation window is partly or wholly overlapped with DRX-on periods. The advantage is that the effect of the DRX functionality on the resource re-evaluation window is reduced. That is to say, the effect of the DRX functionality on the SL transmitting performance is reduced.

In some embodiments, the period P is configured to include at least a resource sensing window and a resource re-evaluation window, no matter whether the resource sensing window and/or the resource re-evaluation window are partly or wholly overlapped with DRX-off periods. FIG. 6, FIG. 7, FIG. 8, and FIG. 9 show several examples of the period P according to some embodiments based on the method 200.

Figure 6:
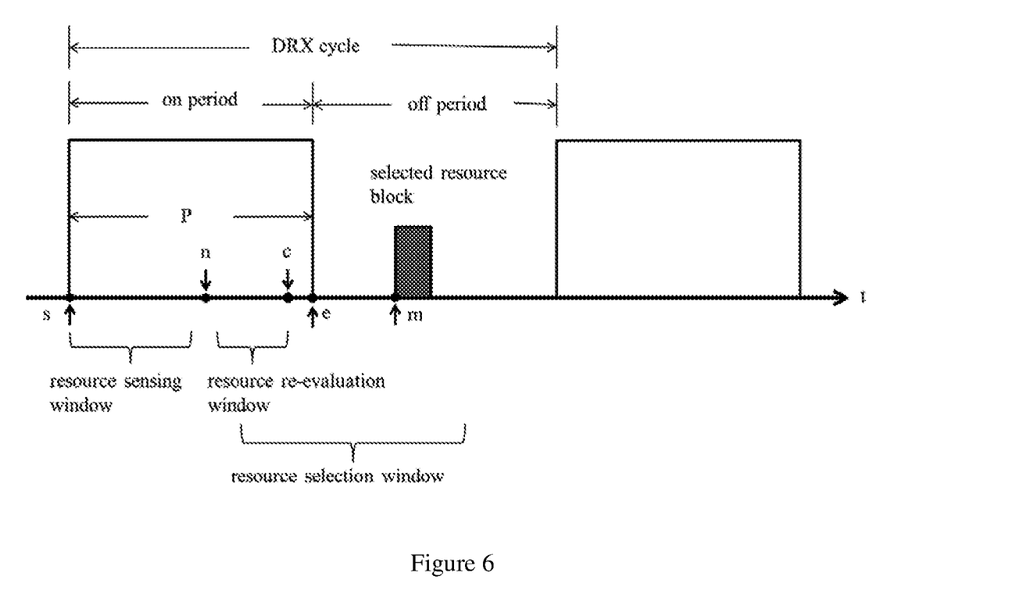
FIG. 6 illustrates an exemplary period for SCI reception according to the present disclosure.

FIG. 6 illustrates an example of the period P according to some embodiments in the case that the resource selection trigger time n is in a DRX-on period, and a resource re-evaluation cut-off time c is also in the DRX-on period. As shown in FIG. 6, the resource sensing window may be configured to start at an outsets of the DRX-on period and end shortly before the resource selection trigger time n, and the resource re-evaluation window may be configured to start before an ending time e of the DRX-on period and end at a resource re-evaluation cut-off time c. In this embodiment, the period P at least includes the resource sensing window and the resource re-evaluation window in the DRX-on period. As shown in FIG. 6, since the resource sensing window and the resource re-evaluation window are in the same DRX-on period, the period P is configured to coincide with the DRX-on period. However, in some embodiments, the period P may end at the resource re-evaluation cut-off time c. The resource re-evaluation cut-off time c is a cut-off time of a resource re-evaluation window predicted without considering the DRX functionality.

Furthermore, as shown in FIG. 6, the period P is wholly overlapped with the DRX-on period.

In some embodiments, the resource re-evaluation window may be configured to start at the resource selection trigger time n.

Figure 7:
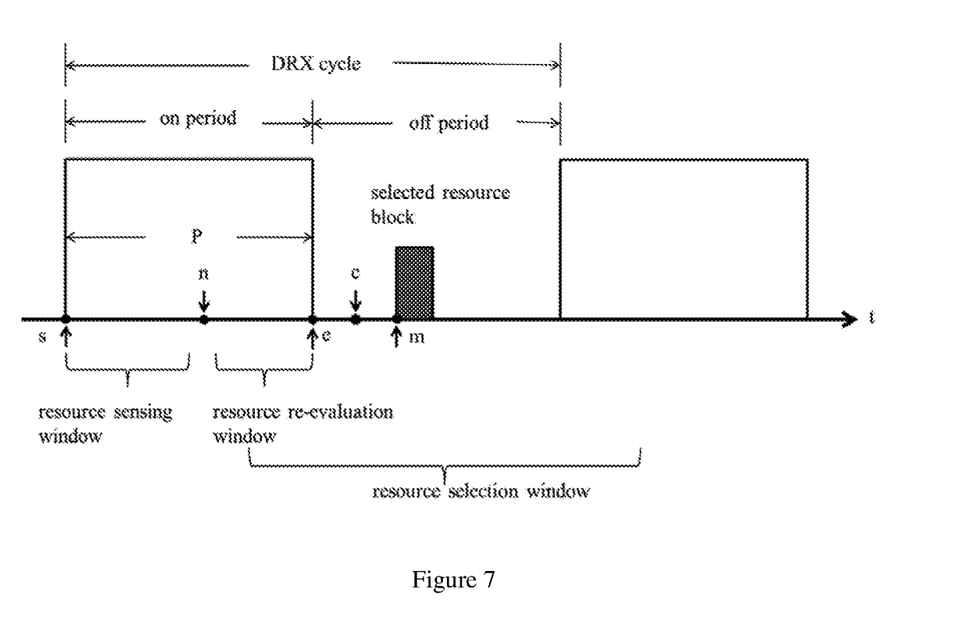
FIG. 7 illustrates an exemplary period for SCI reception according to the present disclosure.

FIG. 7 illustrates an example of the period P according to some embodiments in the case that the resource selection trigger time n is in a DRX-on period, and the resource re-evaluation cut-off time c is in the next DRX-off period. As shown in FIG. 7, the resource sensing window may be configured to start at an outsets of the DRX-on period and end shortly before the resource selection trigger time n, and the resource re-evaluation window may be configured to start before an ending time e of the DRX-on period and end in advance at the ending time e of the DRX-on period. As the resource sensing window and the resource re-evaluation window are in the same DRX-on period, the period P may be configured to be coincided with the DRX-on period. During the period from the ending time of the DRX-on period to the resource re-evaluation cut-off time c, the first UE does not perform SCI reception. Please note that in this example, the resource re-evaluation window actually does not end at the resource re-evaluation cut-off time c, it ends in advance before the resource re-evaluation cut-off time c.

In some embodiments, the resource re-evaluation window still ends at the resource re-evaluation cut-off time c; and the period P is longer than the DRX-on period.

In some embodiments, the resource re-evaluation window may be configured to start at the resource selection trigger time n.

In some embodiments, the duration of the resource sensing window is determined based on a traffic type.

Figure 8:
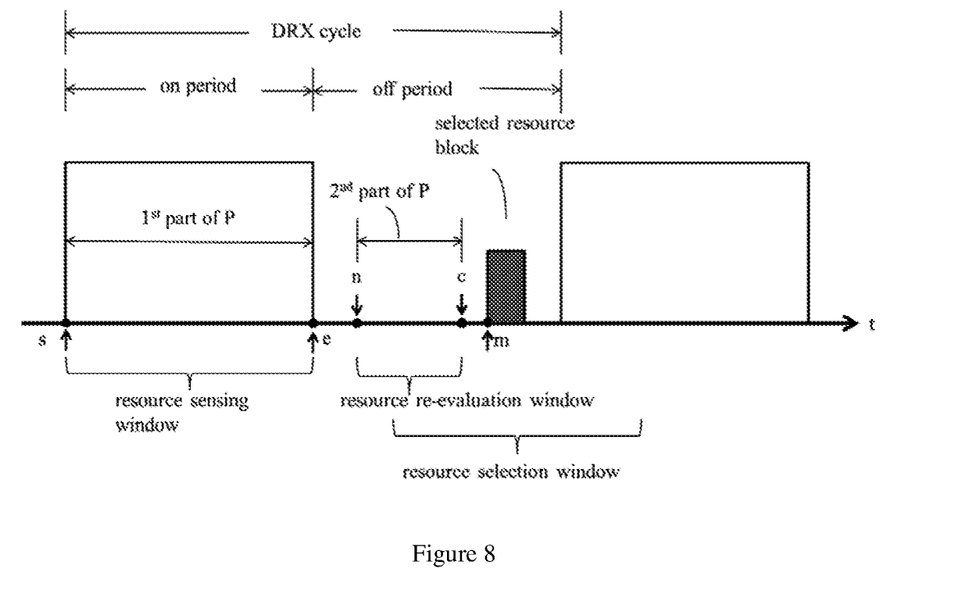
FIG. 8 illustrates an exemplary period for SCI reception according to the present disclosure.

FIG. 8 illustrates an example of the period P according to some embodiments in the case that the resource selection trigger time n is in a DRX-off period, and the time m or the resource re-evaluation cut-off time c are also in the DRX-off period. As shown in FIG. 8, the period P includes two parts. The first part of the period P (i.e., the resource sensing window) is configured to be from an outset s of a last DRX-on period before the DRX-off period and end at a cut-off time e of the last DRX-on period, and the second part of the period P (i.e., the resource re-evaluation window) is configured to be from the resource selection trigger time n to the resource re-evaluation cut-off time c. During the first part of the period P, the first UE performs resource sensing and reserving, during the second part of the period P, the first UE performs resource re-evaluation, and these two parts may be discontinuous. The first part of the period P equals to a DRX-on period in this example. The UE mandatorily wakes up DRX functionality during the second part of the period P; in another word, the first UE performs SCI reception during the period P.

In some embodiments, the resource sensing window may be configured to end after the cut-off time e of the last DRX-on period before the DRX-off period and shortly before the resource selection trigger time n.

Figure 9:
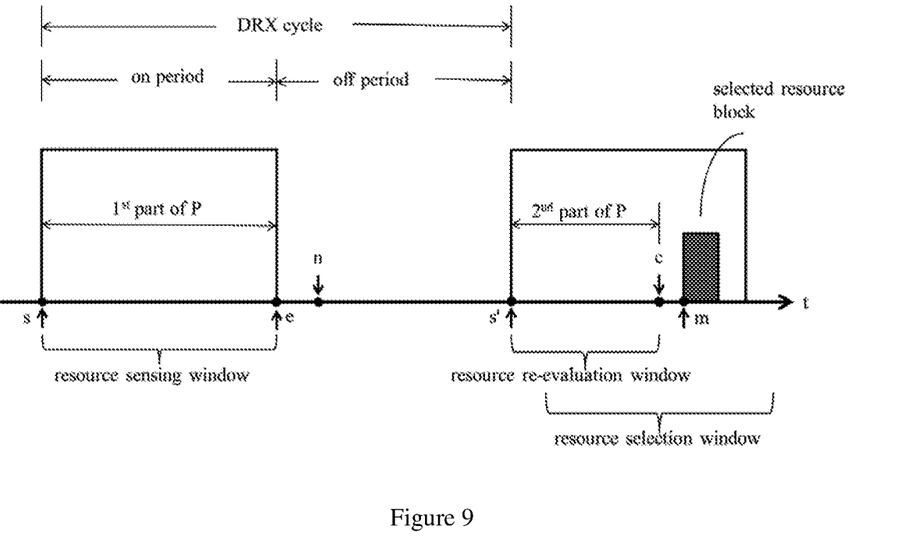
FIG. 9 illustrates an exemplary period for SCI reception according to the present disclosure.

FIG. 9 illustrates an example of the period P according to some embodiments in the case that the resource selection trigger time n is in a DRX-off period, and the time m or the resource re-evaluation cut-off time c are also in the DRX-on period next to the DRX-off period. As shown in FIG. 9, the period P includes two parts. The first part of the period P (i.e., the resource sensing window) is configured to be from an outset s of a last DRX-on period before the DRX-off period and end at a cut-off time e of the last DRX-on period, and the second part of the period P (i.e., the resource re-evaluation window) is configured to be from an outsets' of the DRX-on period next to the DRX-off period and end at the resource re-evaluation cut-off time c. During the first part of the period P, the first UE performs resource sensing and reserving, during the second part of the period P, the first UE performs resource re-evaluation, and these two parts may be discontinuous. The first part of the period P equals to a DRX-on period in this example. The first UE performs SCI reception during the period P.

In some embodiments, the resource sensing window may be configured to end after the cut-off time e of the last DRX-on period before the DRX-off period and shortly before the resource selection trigger time n.

According to the embodiments of the period P illustrated in FIG. 6, FIG. 7, FIG. 8, and FIG. 9, the first UE may perform SCI reception during the period P, no matter whether the period P is partly or wholly overlapped with DRX-on periods. The advantage is that the effect of the DRX functionality on the resource re-evaluation window is reduced. That is to say, the effect of the DRX functionality on the SL transmitting performance is reduced.

In some embodiments, the first UE does not mandatorily perform SCI reception when DRX is off as scheduled. The first UE acquires at least one other resource sensing result obtained by at least one other UE during a period P.

According to the present disclosure, in some cases when quality of service (QoS) requirements of incoming traffic is stringent (e.g., higher than a specified threshold), or when the incoming transmission is a re-transmission of the traffic, the first UE may consider to configure the period P to be from a resource selection trigger time to a resource re-evaluation cut-off time; wherein, if the resource selection trigger time is in a DRX-on period, the UE may consider to configure the period P to be from an ending time of a DRX-on period to the resource re-evaluation cut-off time; or the first UE may consider to send at least one assistance request to at least one other UEs for getting at least one sensing result from the at least one other UEs. Otherwise, the first UE may consider other methods of the present disclosure.

Figure 10:
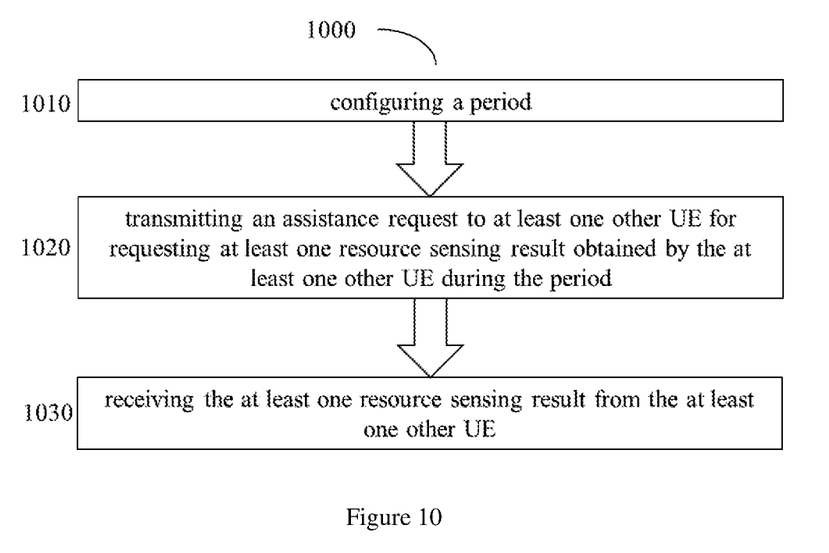
FIG. 10 illustrates an example method according to the present disclosure.

FIG. 10 illustrates an exemplary method 1000 based on the method 200. As shown in FIG. 10, the method 1000 includes at least on operation 1010 of configuring a period P for a first UE configured with Mode 2 resource selection for SL and configured with DRX functionality, an operation 1020 of transmitting an assistance request to at least one other UE for requesting at least one resource sensing result obtained by the at least one other UE during the period P, and an operation 1030 of receiving the at least one resource sensing result from the at least one other UE.

In some embodiments, the assistance request at least indicates the period P during which the at least one resource sensing result obtained by the at least one other UE is requested, and a period of a response time window during which the first UE receives the at least one resource sensing result.

In some embodiments, the period P is a DRX-off period or a part of the DRX-off period of the first UE.

In some embodiments, the period P includes at least a part of the DRX-off period of the first UE.

In some embodiments, the first UE may randomly select resource for transmitting the assistance request.

In some embodiments, the first UE receives the at least one resource sensing result from the at least one other UE during the response time window. If the response time window is partly or wholly overlapped with a DRX-off period, the first UE may mandatorily receive the at least one sensing result during the response time window including the overlapped part.

In some embodiments, the at least one other UE is a second UE, wherein the second UE is an SL peer UE of the first UE, and a PC5 RRC connection is established between first UE and second UE. The first UE sends the assistance request to the second UE, and receives the resource sensing result obtained by the second UE during the period P from the second UE.

In some embodiments, wherein the first UE transmits the assistance request to the second UE via a PC5 radio resource control (PC5-RRC) signaling, and receives the resource sensing result from the second UE via a PC5 RRC signaling.

In some embodiments, wherein the first UE transmits the assistance request to the second UE via a physical layer signaling (e.g., SCI), a radio resource control (RRC) signaling, or another signaling, or in a medium access control (MAC) control element (CE), and receives the resource sensing result from the second UE via a physical layer signaling, an RRC signaling, or another signaling, or in an MAC CE. In some embodiments, the second UE provides a DRX configuration to the first UE. In such cases, the second UE may ignore the assistance request sent by the first UE, yet still send the resource sensing obtained result during the period P to the first UE.

In some embodiments, the second UE is an RSU.

In some embodiments, the at least one other UE is at least one third UE, wherein each of the at least one UE meets a criterion. The first UE sends an assistance request to the at least one third UE, and receives the at least one sensing result from the at least one third UE.

In some embodiments, the assistance request further includes the criterion, in addition to the period P during which the at least one resource sensing result is requested, and the period of the response time window during which the first UE receives the at least one resource sensing result from the at least one third UE.

In some embodiments, the criterion includes at least one of zone information, distance information, a SL-RSRP threshold.

In some embodiments, the zone information at least includes a zone ID showing the zone where the first UE locates. In some embodiments, the at least one third UE may locate in the same zone where the first UE locates.

In some embodiments, the distance information includes at least location information of the first UE and a distance range between the first UE and the at least one third UE. In some embodiments, the at least one third UE may locate in the distance range from the first UE.

In some embodiments, the SL-RSRP of the at least one third UE may above the SL-RSRP threshold. In some embodiments, the first UE does not receive the resource sensing result from the UE whose SL-RSRP is below the SL-RSRP threshold.

In some embodiments, the assistance request is sent to the at least one third UE via a groupcast signaling or a broadcast signaling.

In some embodiments, the first UE receives the at least one resource sensing result from the at least one third UE via a groupcast signaling, a broadcast signaling, a PC5-RRC signaling, a physical layer signaling, an RRC signaling, or another signaling, or in a MAC CE.

In some embodiments, a PC5 RRC connection is established between the first UE and the at least one third UE if the at least one resource sensing result is sent by the at least one third UE via a PC5-RRC signaling.

According to the exemplary method 1000 of the present disclosure, the first UE does not adjust or re-define the resource sensing window and the resource pre-evaluation window, it get the resource sensing result from the at least one other UE obtained during the interested period (i.e., the period P). The advantage is that the first UE configured with DRX functionality may collect all SCI during the resource sensing window and the resource pre-evaluation window with assistance from the other UEs; therefore, the effect of the DRX functionality on the SL transmitting performance is reduced.

The advantages of the various embodiments, examples, and methods mentioned previously are more significant for a time-sensitive traffic, especially for a time-sensitive traffic that occurs periodically.

On the basis of not violating the inventive spirit of the present invention, the above various embodiments in the present invention can be reasonably combined and reasonably extended.

In some embodiments, the period P is configured to include at least part of at least one of the resource sensing window and/or the resource re-evaluation window.

For example, when a resource selection trigger occurs, the period may be configured to include both the resource sensing window and the resource re-evaluation window without considering DRX functionality. Referring back to FIG. 1, the period P may include both the resource sensing window and the resource re-evaluation window according to the present disclosure. In another word, the UE mandatorily perform SCI reception during the two overlapped parts.

For example, referring to FIG. 7, the period P may be configured to be from the outset s of the DRX-on period to the resource re-evaluation cut-off time c; in another word, the resource re-evaluation window may be configured to end at the resource re-evaluation cut-off time c The present invention provides various methods, embodiments, and examples for performing SCI RECEPTION for SL transmitting a DRX-configured UE (e.g., the first UE), which can reduce the impact of DRX on the performance of SL transmitting, and still maintain the power saving advantages of DRX.

Figure 11:
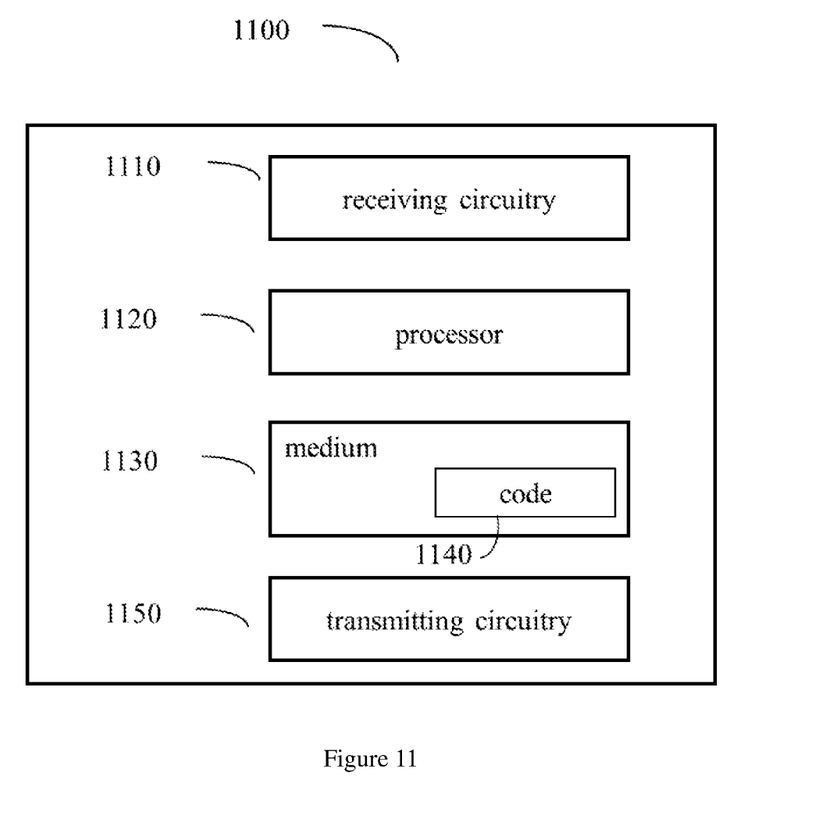
FIG. 11 illustrates an example apparatus according to the present disclosure.

FIG. 11 illustrates an example apparatus 1100 for performing the various methods, embodiments, and examples of the present disclosure, which, for example, may be at least a part of a UE (e.g. the first UE).

As shown in FIG. 11, the apparatus 1100 may include at least one receiving circuitry 1110, at least one processor 1120, at least one non-transitory computer-readable medium 1130 with computer-executable 1540 stored thereon, and at least one transmitting circuitry 1150. The at least one medium 1130 and the computer program code 1140 may be configured to, with the at least one processor 1120, cause the apparatus 1100 at least to perform at least the example method 200 described above, wherein, for example, the apparatus 1100 may be the first UE in the example method 200.

In various example embodiments, the at least one processor 1120 may include, but not limited to, at least one hardware processor, including at least one microprocessor such as a CPU, a portion of at least one hardware processor, and any other suitable dedicated processor such as those developed based on for example Field Programmable Gate Array (FPGA) and Application Specific Integrated Circuit (ASIC). Further, the at least one processor 1120 may also include at least one other circuitry or element not shown in FIG. 11.

In various example embodiments, the at least one medium 1130 may include at least one storage medium in various forms, such as a volatile memory and/or a non-volatile memory. The volatile memory may include, but not limited to, for example, an RAM, a cache, and so on. The non-volatile memory may include, but not limited to, for example, an ROM, a hard disk, a flash memory, and so on. Further, the at least medium 1130 may include, but are not limited to, an electric, a magnetic, an optical, an electromagnetic, an infrared, or a semiconductor system, apparatus, or device or any combination of the above.

Further, in various example embodiments, the example apparatus 1100 may also include at least one other circuitry, element, and interface, for example antenna element, and the like.

In various example embodiments, the circuitries, parts, elements, and interfaces in the example apparatus 1100, including the at least one processor 1100 and the at least one medium 1130, may be coupled together via any suitable connections including, but not limited to, buses, crossbars, wiring and/or wireless lines, in any suitable ways, for example electrically, magnetically, optically, electromagnetically, and the like.

The methods of the present disclosure can be implemented on a programmed processor. However, controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device that has a finite state machine capable of implementing the flowcharts shown in the figures may be used to implement the processing functions of the present disclosure.

While the present disclosure has been described with specific embodiments thereof, it is evident that many alternatives, modifications, and variations will be apparent to those skilled in the art. For example, various components of the embodiments may be interchanged, added, or substituted in other embodiments. Also, all of the elements shown in each figure are not necessary for operation of the disclosed embodiments. For example, one skilled in the art of the disclosed embodiments would be capable of making and using the teachings of the present disclosure by simply employing the elements of the independent claims. Accordingly, the embodiments of the present disclosure as set forth herein are intended to be illustrative, not limiting. Various changes may be made without departing from the spirit and scope of the present disclosure.

In this disclosure, relational terms such as "first," "second," and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed is:

1. An apparatus comprising:
a memory; and
a processor coupled to the memory, the processor configured to cause the apparatus to:
configure, for a first user equipment (UE) configured with Mode 2 resource selection for sidelink (SL) and configured with discontinuous reception (DRX) functionality, one or more of a first period during which the first UE performs SL control information (SCI) reception or a second period during which at least one resource sensing result obtained by at least one other UE is requested by the first UE; and
perform one or more of to:
perform SCI reception at least during one or more of the first period or the second period; or
receive the at least one resource sensing result from the at least one other UE.

2. The apparatus of claim 1, wherein one or more of the first period or the second period is configured to include at least a re-evaluation window.

3. The apparatus of claim 2, wherein to configure the first period during which the first UE performs SCI reception the processor is configured to cause the apparatus to one or more of:
  configure the first period to be from a resource selection trigger time to a resource re-evaluation cut-off time; or
  configure the first period to be from an ending time of a DRX-on period to the resource re-evaluation cut-off time, wherein the resource selection trigger time is in the DRX-on period.

4. The apparatus of claim 1, wherein in response to the second period during which the at least one resource sensing result obtained by the at least one other UE is requested by the first UE being configured, the processor is configured to cause the apparatus to:
  transmit an assistance request to a second UE for requesting a resource sensing result obtained by the second UE during the second period; and
  receive the resource sensing result from the second UE, wherein
  the second UE is a sidelink peer UE of the first UE, a PC5 RRC connection is established between first UE and second UE, and the second period includes at least a part of a DRX-off period.

5. The apparatus of claim 4, wherein:
  the assistance request is configured to at least indicate the second period during which the resource sensing result obtained by the second UE is requested, and a third period of a response time window during which the first UE receives the resource sensing result by the first UE; and
  the first UE is configured to receive the resource sensing result during the response time window.

6. The apparatus of claim 1, wherein in response to the second period during which the at least one resource sensing result obtained by the at least one other UE is requested by the first UE, the processor is configured to cause the apparatus to:
  transmit an assistance request to at least one third UE for requesting the at least one resource sensing result obtained by the at least one third UE during the second period; and
  receive the at least one resource sensing result from the at least one third UE, wherein the at least one third UE meets a criterion, wherein
  the second period includes at least a part of a DRX-off period.

7. The apparatus of claim 6, wherein the processor is configured to cause the apparatus to transmit the assistance request via one or more of a groupcast signaling or a broadcast signaling, and the at least one resource sensing result is sent by the at least one third UE via one or more of a groupcast signaling, a broadcast signaling, or a PC5-RRC signaling.

8. The apparatus of claim 6, wherein the criterion at least includes one of zone information, distance information, or a SL reference signal receiving power (SL-RSRP) threshold.

9. The apparatus of claim 6, wherein:
  the assistance request at least indicates the criterion, the second period during which the at least one resource sensing result is requested, and a third period of a response time window during which the first UE receives the at least one resource sensing result; and
  the first UE is configured to receive the at least one resource sensing result during the response time window.

10. The apparatus of claim 1, wherein the second period is configured to include at least a resource sensing window and a resource re-evaluation window.

11. The apparatus of claim 10, wherein in response to that a resource selection trigger time being in a DRX-on period, the processor is configured to cause the apparatus to configure the first period during which the first UE performs SCI reception including to at least one of:
  configure the resource sensing window to start at an outset of the DRX-on period and end before the resource selection trigger time;
  configure the resource re-evaluation window to start before an end of the DRX-on period; or
  configure the resource re-evaluation window to end in advance at the end of the DRX-on period in response to that a resource re-evaluation cut-off time is in a DRX-off period, or configure the resource re-evaluation window at the resource re-evaluation cut-off time in response to that the resource re-evaluation cut-off time is in the DRX-on period.

12. The apparatus of claim 10, wherein in response to a resource selection trigger time being in a DRX-off period, the processor is configured to cause the apparatus to configure the first period during which the first UE performs SCI reception include to at least one of:
  configure the resource sensing window to start at an outset of a last DRX-on period before the DRX-off period and end at a cut-off time of the last DRX-on period; or
  perform SCI reception in the resource re-evaluation window.

13. The apparatus of claim 12, wherein to perform SCI reception in the resource re-evaluation window the processor is configured to cause the apparatus to one or more of:
  perform SCI reception from the resource selection trigger time to a resource re-evaluation cut-off time in response to a selected resource or the resource re-evaluation cut-off time being in the DRX-off period; or
  configure the resource re-evaluation window to start from an outset of a DRX-on period next to the DRX-off period and end at the resource re-evaluation cut-off time in response to one or more of the selected resource or the resource re-evaluation cut-off time being in the DRX-on period next to the DRX-off period.

14. The apparatus of claim 1, wherein to configure the first period during which the first UE performs SCI reception the processor is configured to cause the apparatus to perform SCI reception when a resource pool is configured.

15. An apparatus comprising:
  a memory; and
  a processor coupled to the memory, the processor configured to cause the apparatus to:
    configure, for a first user equipment (UE) configured with Mode 2 resource selection for sidelink (SL) and configured with discontinuous reception (DRX) functionality, a first period;
    transmit an assistance request to a second UE for requesting at least one resource sensing result obtained by the second UE during the first period; and
    receive the at least one resource sensing result from the second UE.

16. The apparatus of claim 15, wherein the assistance request comprises an indication of the first period and an indication of a second period of a response time window during which the first UE is to receive the at least one resource sensing result.

17. The apparatus of claim 15, wherein the first period comprises one or more of a DRX-off period or a part of the DRX-off period of the first UE.

18. The apparatus of claim 15, wherein the processor is configured to cause the apparatus to randomly select a resource for transmitting the assistance request.

19. The apparatus of claim 15, wherein the second UE comprises an SL peer UE of the first UE, and the processor is configured to cause the apparatus to:
- establish a PC5 radio resource control (RRC) connection between the first UE and second UE;
- transmit the assistance request to the second UE; and
- receive the at least one resource sensing result from the second UE during the first period.

20. A method comprising:
- configuring, for a first user equipment (UE) configured with Mode 2 resource selection for sidelink (SL) and configured with discontinuous reception (DRX) functionality, one or more of a first period during which the first UE performs SL control information (SCI) reception or a second period during which at least one resource sensing result obtained by at least one other UE is requested by the first UE; and
- one or more of:
  - performing SCI reception at least during one or more of the first period or the second period; or
  - receiving the at least one resource sensing result from the at least one other UE.

* * * * *